(12) United States Patent
Mount et al.

(10) Patent No.: US 8,310,211 B1
(45) Date of Patent: Nov. 13, 2012

(54) AUTO-REGULATED MOTION POWER SYSTEM

(75) Inventors: Robert Mount, Lindon, UT (US); David Spencer, Orem, UT (US)

(73) Assignee: Advanced Power Systems, LLC, Lindon, UT (US)

( * ) Notice: Subject to any disclaimer, the term of this patent is extended or adjusted under 35 U.S.C. 154(b) by 0 days.

(21) Appl. No.: 12/969,924

(22) Filed: Dec. 16, 2010

Related U.S. Application Data

(60) Provisional application No. 61/287,666, filed on Dec. 17, 2009.

(51) Int. Cl.
H02P 9/00 (2006.01)
(52) U.S. Cl. ............................... 322/24; 322/44
(58) Field of Classification Search ............ 322/24
See application file for complete search history.

(56) References Cited

U.S. PATENT DOCUMENTS

| | | | |
|---|---|---|---|
| 4,992,920 A | | 2/1991 | Davis |
| 5,925,964 A | * | 7/1999 | Kusase et al. .............. 310/263 |
| 7,095,214 B2 | * | 8/2006 | O'Gorman et al. .......... 322/28 |
| 7,176,658 B2 | * | 2/2007 | Quazi et al. ................. 322/24 |
| 7,439,715 B2 | * | 10/2008 | Rozman et al. ............. 322/45 |

\* cited by examiner

*Primary Examiner* — Tulsidas C Patel
*Assistant Examiner* — Stefan Mikailoff
(74) *Attorney, Agent, or Firm* — ColterJennings

(57) ABSTRACT

An auto-regulated motion power system apparatus that may be used to generate usable electricity from disparate energy sources includes a combination of a variable frequency alternator driven by a primary mover and coupled to a load. An energy control module includes a closed-loop feedback system coupled to a pulse width modulation controller and a switch mode rectifier. The alternator has a modulated control signal input having the ability to vary in frequency and voltage with an output having a controlled voltage and varying frequency. The switch mode rectifier accepts variable AC voltages from the alternator and outputs a constant predetermined DC voltage both to one side of the windings of the alternator and to a first side of a high frequency switch. An output on the pulse width modulation generator is connected to a switch control so that when the switch is closed, current flows through the windings of the alternator and when the switch is open, no current flows through the windings. This modulation of current flow (or lack thereof) regulates the magnetic field strength inside the alternator to produce a stable voltage over a wide range of RPMs.

14 Claims, 11 Drawing Sheets

AUTO-REGULATED MOTION POWER SYSTEM

CROSS-REFERENCE TO RELATED APPLICATIONS

This application claims priority based on U.S. Provisional Patent Application Ser. No. 61/287,666 filed Dec. 17, 2009 and titled "Auto-regulated Motion Power System," the disclosure of which is incorporated herein by this reference.

BACKGROUND

This invention relates to an apparatus for converting rotational energy into electrical energy, and a system of using the apparatus to recover energy as useful power that would otherwise be lost.

Providing portable AC power is an expanding field. In particular, many automobiles are now being equipped with inverters to provide 110V AC power to outlets in the vehicle. However, providing high amperage power can be difficult and inefficient. Furthermore, providing such power often requires significant revving of the engine, meaning a person has to be sitting at the wheel to press on the gas pedal or a high idle controller must be installed in the vehicle, increasing costs. The standard "stock" alternator is not sufficient to provide higher amperages than the design of the automobile requires for engine ignition, engine control computer, radio, and standard signal and lighting requirements.

Previously, it was often necessary to utilize a generator configured to produce constant-frequency AC output at a specific higher engine rotational rate (fixed RPM), for example through reduction gears (going from 3600 RPM, for example, to 1800 RPM for a 60 Hz output). Such systems are normally configured to maintain a constant rotational rate through a governor or other rotational regulator. Use of a variable rotational speed was often impractical.

Many water systems have very high pressure at the source, which pressure must be reduced prior to sending the water into the general municipal water supply. Reducing this pressure typically involves pressure regulator valves, which unfortunately waste all of the potential energy available in the high-pressure water. Windmills may also be used to generate rotational potential energy, and much effort has gone into exploiting that energy source. Thus, an apparatus that could convert a variety of sources of potential energy into usable electricity would be useful.

SUMMARY

This application discloses an auto-regulated motion power system ("AMPS") apparatus that may be used to generate usable electricity from existing energy sources. In particular, the AMPS apparatus includes a combination alternator and energy control module that may be used to convert sources of potential or rotary energy to, for example, 115V AC power. The apparatus has potential application in the production of energy where the prime mover (source of energy) is not constrained to a specific RPM to deliver sufficient energy to an alternator to maintain a given load.

The present apparatus includes a three-phase variable frequency alternator having an input that is attachable to a prime mover (a source of power), coupled to an inverter or frequency controller and to an energy control module ("ECM"). The alternator may alternatively be connected to a frequency independent load, which would eliminate the need for a frequency controller. The ECM includes a multi-phase closed-loop feedback system coupled to a pulse width modulation controller and an inverter or switch mode rectifier ("SMR") to convert variable frequency energy to useful, clean, constant, AC power.

The alternator has a modulated control signal input having the ability to vary in frequency and voltage with an output having a set voltage and varying frequency. The output of the alternator also connects to a feedback loop and control system having a field driver incorporated into the ECM. The alternator has at least one set of windings that permit application of a variable magnetic field inside the alternator.

The energy control module or ECM typically has a three-phase switch mode rectifier ("SMR") that accepts variable AC voltages (for example, voltages from 120 to 600 volts) from the alternator and outputs a constant predetermined DC voltage both to one side of the field winding of the alternator and to one side of a high frequency switch. An output on the pulse width modulation generator is connected to the switch control so that when the switch is closed current flows through the windings of the alternator and when the switch is open no current flows through the windings. This current flow (or lack thereof) will increase and decrease the magnetic field strength inside the alternator field winding, and may be regulated sufficiently at high speeds so as to maintain a predetermined field strength inside the alternator, thereby causing the alternator to produce a predetermined stable voltage over a wide range of RPMs of the prime mover. The alternator also has the ability to accept a low-voltage, low current source for initial activation (or excitation) of the alternator when "priming" of the alternator is required.

The AMPS apparatus may be employed in numerous fields where there exists an energy source capable of turning the shaft of the alternator. Exemplary fields of application include (1) mobile power where the primary mover is an internal combustion engine; (2) in combination with turbines to replace PRVs (pressure regulator valves) in pressurized water systems or moving water with varying flows and elevation changes, and (3) wind driven applications. An energy source capable of turning the shaft of the alternator with adequate torque requirements will allow the apparatus to produce output power.

One advantage of the present apparatus is its ability to produce relatively constant output power with a variable frequency energy input source. This constant output power allows for the production of power from green energy sources, such as wind turbines or turbines in a water flow. However, in the case of a combustion engine, where maximum optimal efficient power is typically required at lower rotational speeds or even the idle speed of the engine, the constant output also results in reduced carbon emissions because the power may be generated with reduced fuel consumption compared to devices that require the engine to operate at higher speeds.

The AMPS apparatus may be used to generate clean, reliable power from a prime mover while providing increased efficiency by optimizing efficiencies of the prime mover for power requirements. It also allows a wider range of prime mover possibilities. Unlike traditional generators that require a constant RPM, the AMPS apparatus delivers power over a wide range of rotational inputs (typically, 1000 RPM to 18,000 RPM). When the AMPS apparatus is implemented with combustion engines, throttle speed is typically no longer a major concern. A vehicle, boat, etc. can fulfill predetermined load requirements when the engine is at idle or full throttle or most anywhere in between, whenever the engine is running and can provide sufficient torque for the power application. The system becomes an efficient, RPM independent, power generator.

In a mobile application, the AMPS apparatus can be utilized to power intersection traffic lighting during power outages, emergency communications, emergency lighting, utility and construction vehicles, military or defense operations, marine applications, and even medical equipment. It can also power equipment in remote areas without the need for separate fuel systems, heavy trailers or taking up significant amounts of valuable space in vehicles. Due to its control and regulation design, the AMPS apparatus can also regulate torque while producing power. In an in-line hydro application this feature allows water pressure and flow control dynamically while converting normally wasted energy to power. The apparatus can also be used to replace pressure regulator valves in in-line hydro systems, as well as in numerous other applications.

BRIEF DESCRIPTION OF THE DRAWINGS

Other features and advantages of the present invention will be apparent from reference to the following Detailed Description taken in conjunction with the accompanying Drawings, in which.

DETAILED DESCRIPTION

Figure 1:
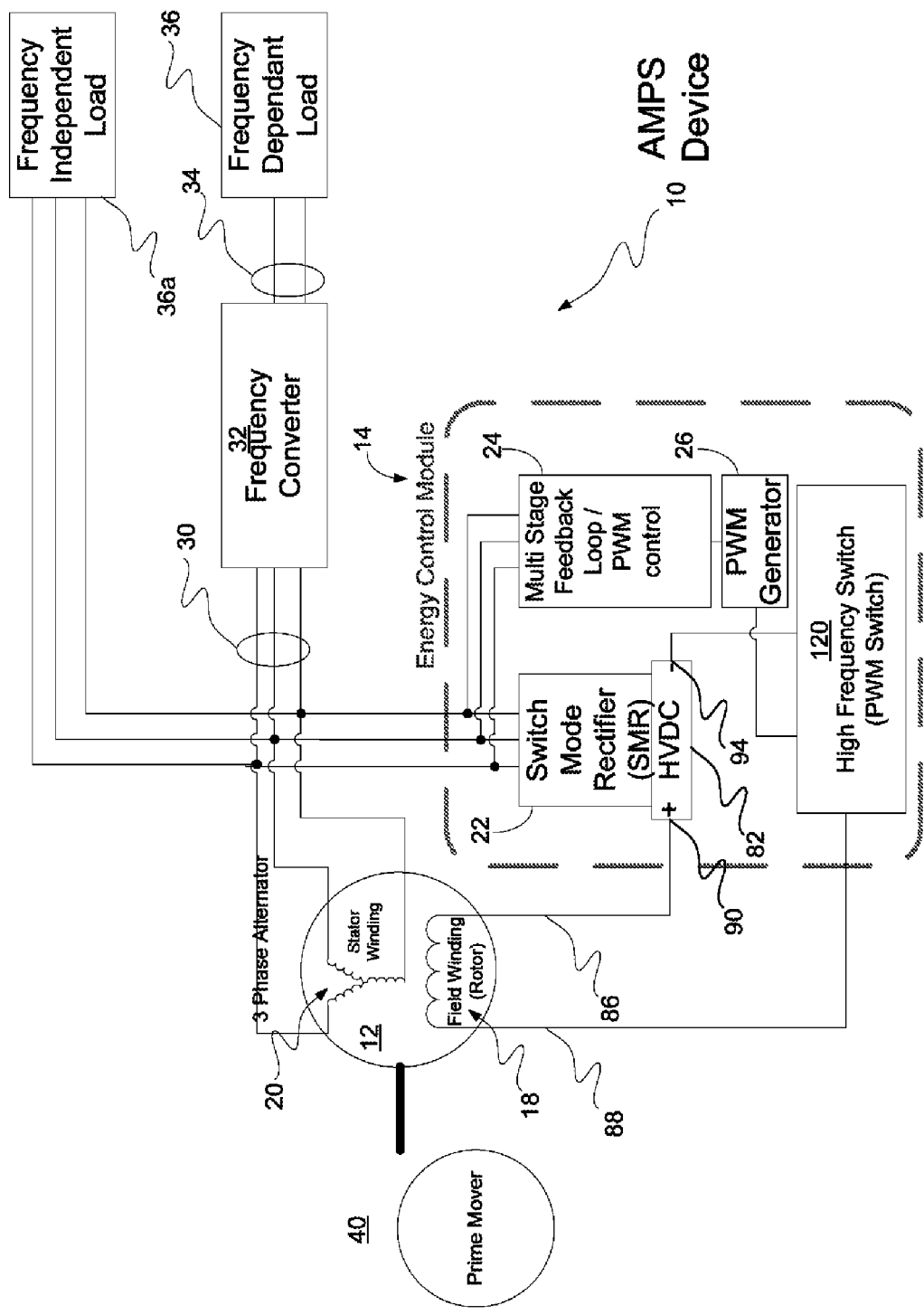
FIG. 1 depicts a block diagram of the apparatus.
Figure 2:
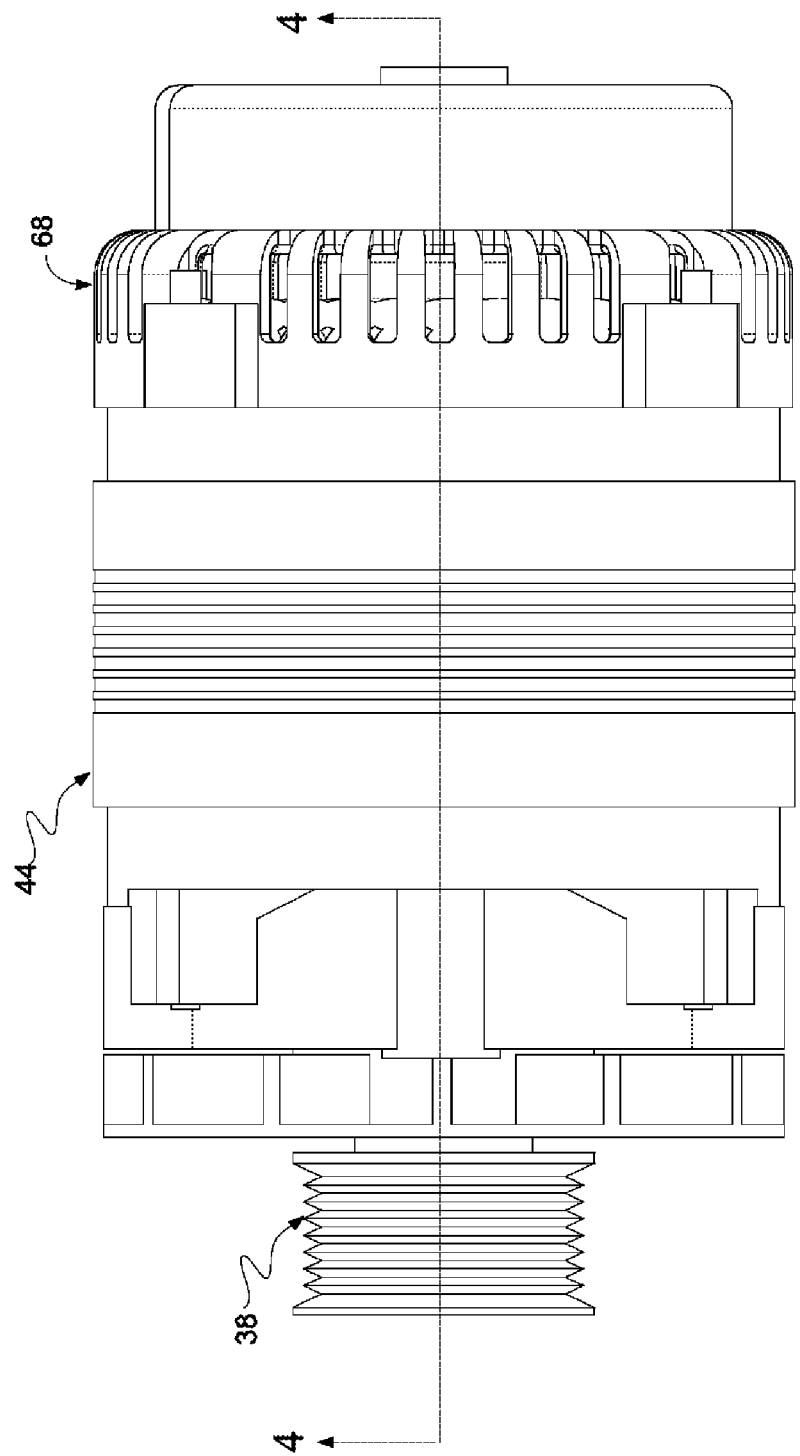
FIG. 2 depicts a side view of an alternator constructed for use in the apparatus of FIG. 1.
Figure 3:
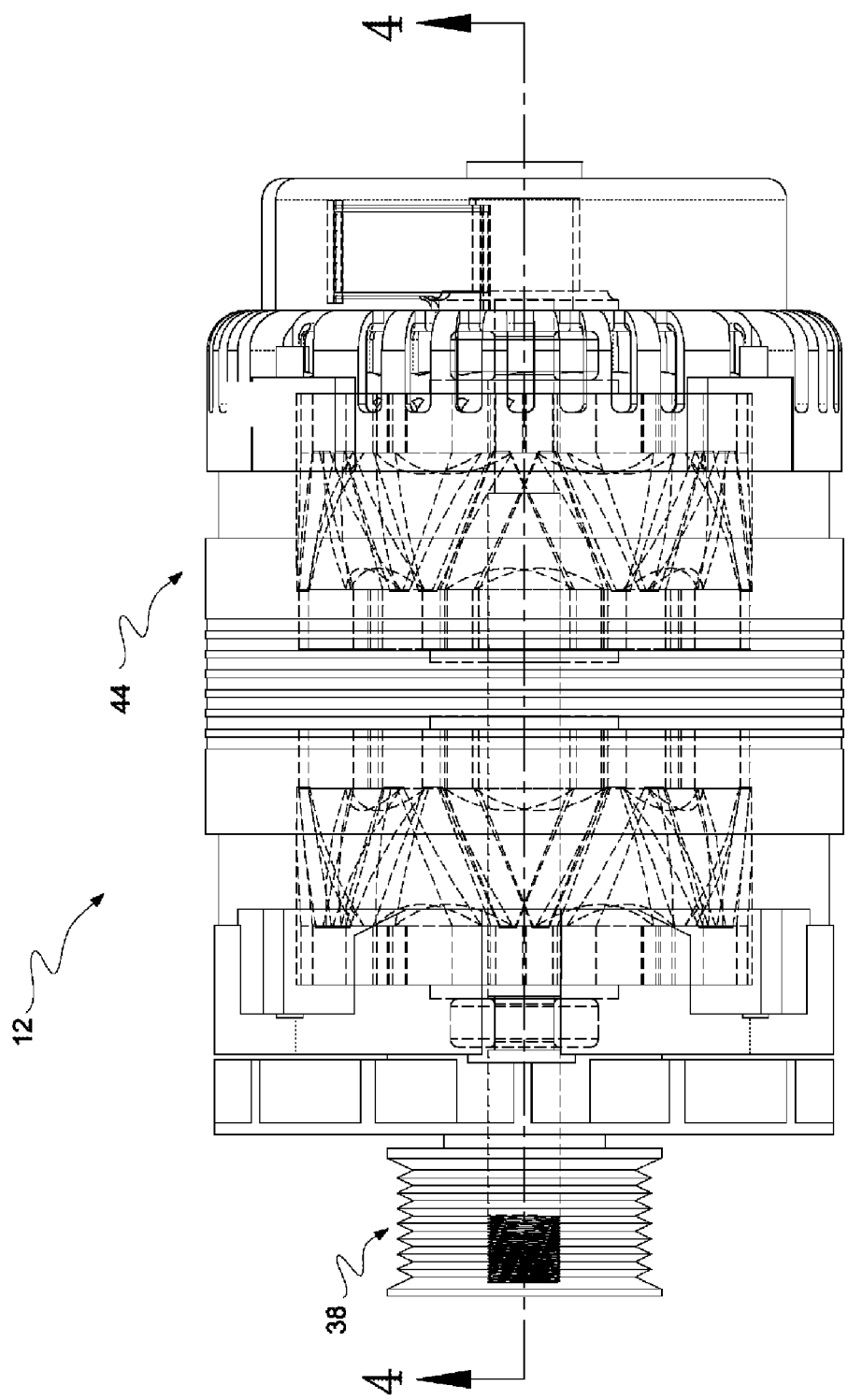
FIG. 3 depicts a side view the alternator of FIG. 2 showing certain interior components of the alternator in dashed lines.
Figure 4:
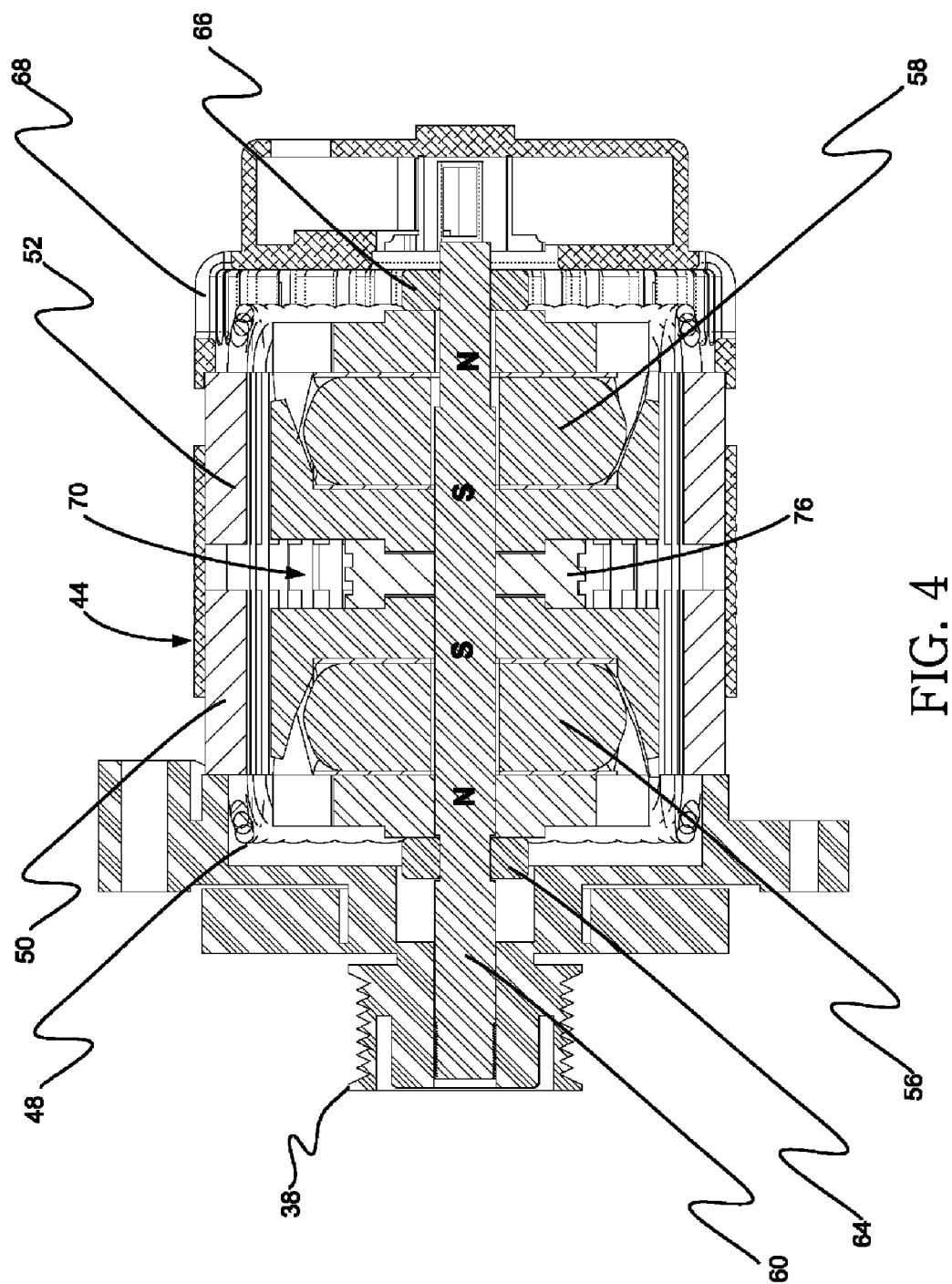
FIG. 4 depicts a cross-sectional view of the alternator of FIG. 2 taken along the line 4-4 of FIG. 2.
Figure 5:
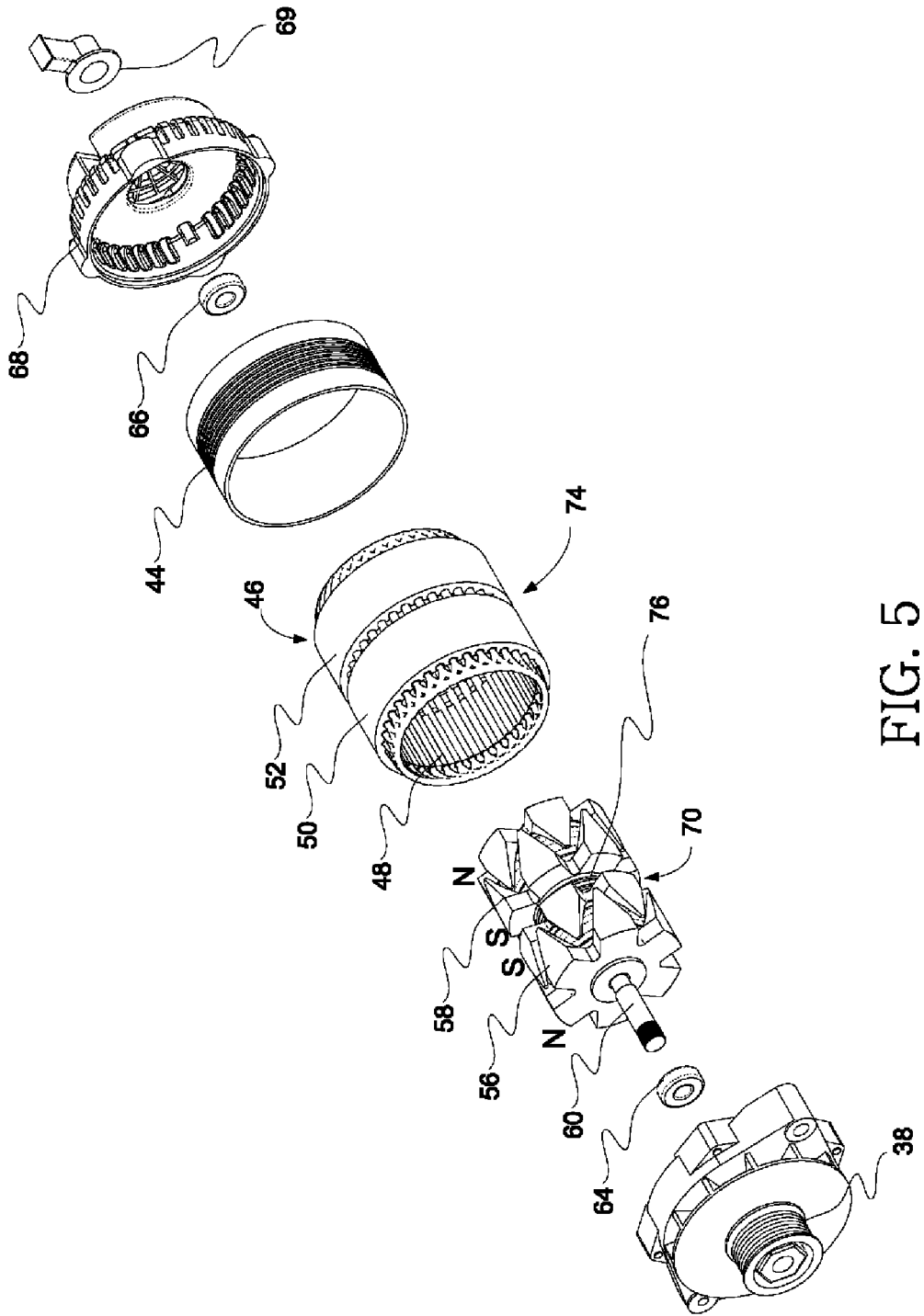
FIG. 5 depicts an exploded view of the alternator of FIG. 2.

FIG. 1 depicts a block diagram of an exemplary embodiment of an auto-regulated motion power system ("AMPS") device 10. The AMPS device comprises a three-phase alternator 12 coupled to an energy control module ("ECM") 14. The alternator has a rotating high-voltage field winding 18 and a fixed high voltage phase delta connected stationary (stator) winding 20. The energy control module 14 includes a switch mode rectifier 22, a multistage feedback loop 24 and a pulse width modulation generator 26.

The alternator has a three-phase high-voltage alternating current wye (Y) output 30 that is connected to a frequency converter 32, which may have storage and backup options as is known in the art. The output 34 of the frequency converter may be used to drive a load 36, or the output of the alternator may be connected directly to a non-frequency dependent load 36a. The alternator includes a pulley assembly 38 (see FIGS. 2-5) on one end that is adapted to be connected to a prime mover 40, that is, a source of rotating mechanical power such as the shaft of an internal combustion engine or a windmill or some other source of power.

As depicted in FIGS. 2-5, according to one embodiment, the housing 44 of the alternator 12 holds a cylindrical stator 46 having multiple windings 48 as is typical with alternators. Each winding is wound through two separate laminated steel sections with a gap between each winding. The stator sections or assemblies 50 and 52 are keyed together and operate in phase with each other.

The stator assemblies 50 and 52 are wound electrically as a single unit, but the effect is that of two stators wired in series, operating in phase. The gap between the stator assemblies is typically short, so that the copper losses between the assemblies is much less than the losses in the loops at the end of a standard stator. This reduction in losses is an improvement over simply stacking independent alternators. Reducing the inductance in the area where there is no magnetic field to excite the stator material further enhances the output.

According to one embodiment, two Lundell type high voltage dual claw pole rotor assemblies 56 and 58 keyed on a common shaft 60. The entire assembly is rotatably mounted inside the cylindrical stator 46 by a front bearing 64 and a rear bearing 66 between the rear housing 68 of the alternator and the pulley assembly 38 of the alternator. The rotor assemblies are oriented North-South-South-North, meaning one assembly is mounted on the common shaft with its north magnetic pole towards the front (that is, towards the pulley assembly 38) and with its south magnetic pole towards the rear (that is, towards the rear housing 68) of the alternator. A brush housing 69 mounts to the rear housing 68. The other rotor assembly is mounted on the common shaft with its south magnetic pole towards the front of the alternator and its north magnetic pole towards the rear of the alternator. Thus, the two south poles of the respective rotor assemblies are adjacent on the common shaft. A gap 70 between the two coils enables the rotor assemblies to develop independent magnetic fields. In other embodiments, only one Lundell claw is used, which reduces size and weight but also reduces the level of output power.

The separation of the two rotor assemblies 56 and 58 allows them to develop full magnetic fields, instead of forcing the two like fields in the center of the assembly together, possibly causing stray magnetic fields and a loss of some strength. As a result, when the pulley assembly 38 is spun by the prime mover 40, the two rotor assemblies rotate within the stator and generate alternating current electricity in the stator. The combination of the magnetically isolated rotor assemblies 56 and 58 powered by an electrically common stator winding 48 excites the mechanically isolated but electrically common stator assemblies 50 and 52, producing output across a wide rotational speed range.

By introducing the gap 70 between the two like poles of the rotor assemblies 56 and 58, the full magnetic field is able to act on the poles. This is accomplished by introducing a non-magnetic spacer 76 between the rotor assemblies 56 and 58. The size of the spacer is a function of the design specifics for the size and output of the alternator. This spacer may be aluminum, composite, plastic or any other nonmagnetic material. To further isolate the rotors' magnetic fields, the shaft may be made from a nonmagnetic alloy such as titanium, some forms of stainless steel, bronze or other material. If the shaft is made from a magnetic material, a sleeve between the rotor assemblies and the shaft made from nonmagnetic material as mentioned above would serve the same purpose.

While the rotor assemblies 56 and 58 operate as a direct current electromagnet, the stator assemblies 50 and 52 produce a polyphase alternating current output. The two stator assemblies 50 and 52 in the alternator 12 share a single winding 48 that passes across the gap 70 in the rotor assemblies 56 and 58. The two stator assemblies are in phase with each other, as are the rotor assemblies. The rotor assemblies operate magnetically as independent units, exciting the two stator segments.

The reduction of stray magnetic fields and the reduction of unneeded inductance improve the thermal efficiency of the unit as well. All or a significant portion of the magnetic stresses of closely coupled like fields are dissipated as heat in the unit. The inductance of the stator windings passing through an area of laminations that is not excited also produces heat. The design does not have either situation present.

A high-voltage direct current buck converter 82 is connected to the rotor assemblies 56 and 58. The DC field winding 18 has a positive connection 86 and a negative connection 88. The positive connection is connected to a positive direct current output of the switch mode rectifier 22 in the energy control module 14. The negative output 94 of the switch mode rectifier connects to the pulse width modulation high frequency switch 120. The other side of the high frequency switch connects to the negative connection of the DC field winding 18.

The switch mode rectifier 22 is designed with a wide range voltage input and a regulated output. The current on the leads from the wye (Y) output 30 of the alternator 12 is applied to the three phase input 106 (See FIG. 6) of the switch mode rectifier and is rectified to direct current by a three phase bridge rectifier 108 (See FIG. 6). The direct current is passed to the buck converter 82 (see FIG. 7) that reduces the direct current to a specified output voltage. The positive output voltage is applied to a positive connection 90 on the direct current field winding 18 of the alternator 12 and the negative return 94 is applied to the pulse width modulation generator 26.

The voltage from the wye (Y) output 30 is also applied to the multistage feedback loop 24. The pulse width modulation generator 26 has a high-frequency pulse width modulation switch 120 connected between the negative return and the negative connection 94 of the DC field winding 18. The pulse width modulation generator 26 is also connected to an output 126 (See FIG. 9) of the multistage feedback loop 24.

Figure 10:
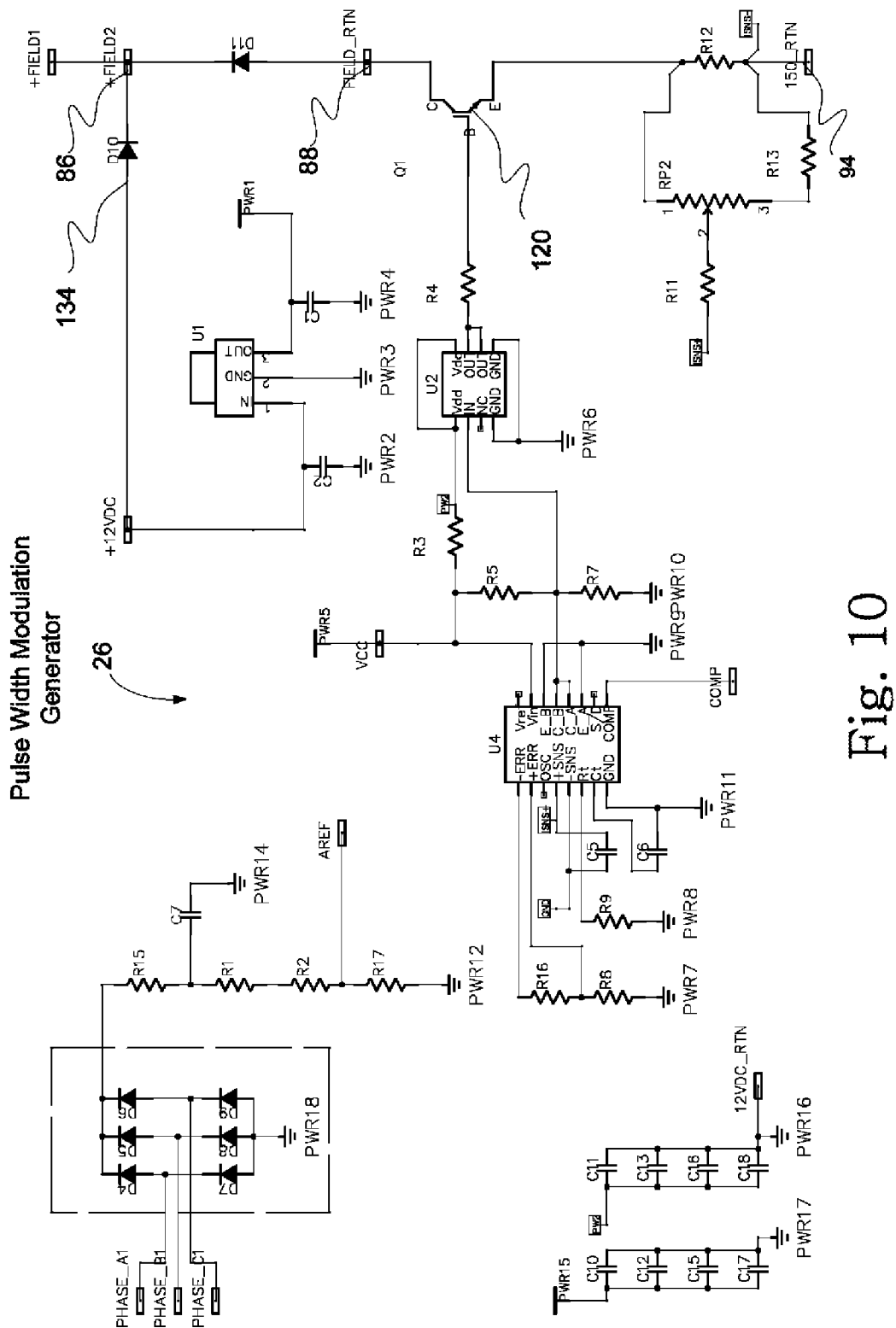
FIG. 10 depicts a schematic diagram of the circuitry of a pulse width modulation controller included in an energy control module according to one embodiment of the apparatus of FIG. 1.

The multi-stage feedback loop 24 monitors the voltage level of the wye (Y) output 30 and uses that information to control the frequency of engagement of the pulse width modulation switch 120 (see FIG. 10). By controlling the frequency or level of engagement of the pulse width modulation switch, the level of generation of power from the alternator 12 is regulated to maintain the voltage on the wye (Y) output 30. In other words, the pulse width modulation switch 120 turns the alternator DC field winding 18 on and off, thereby regulating the output voltage of the alternator.

Figure 6:
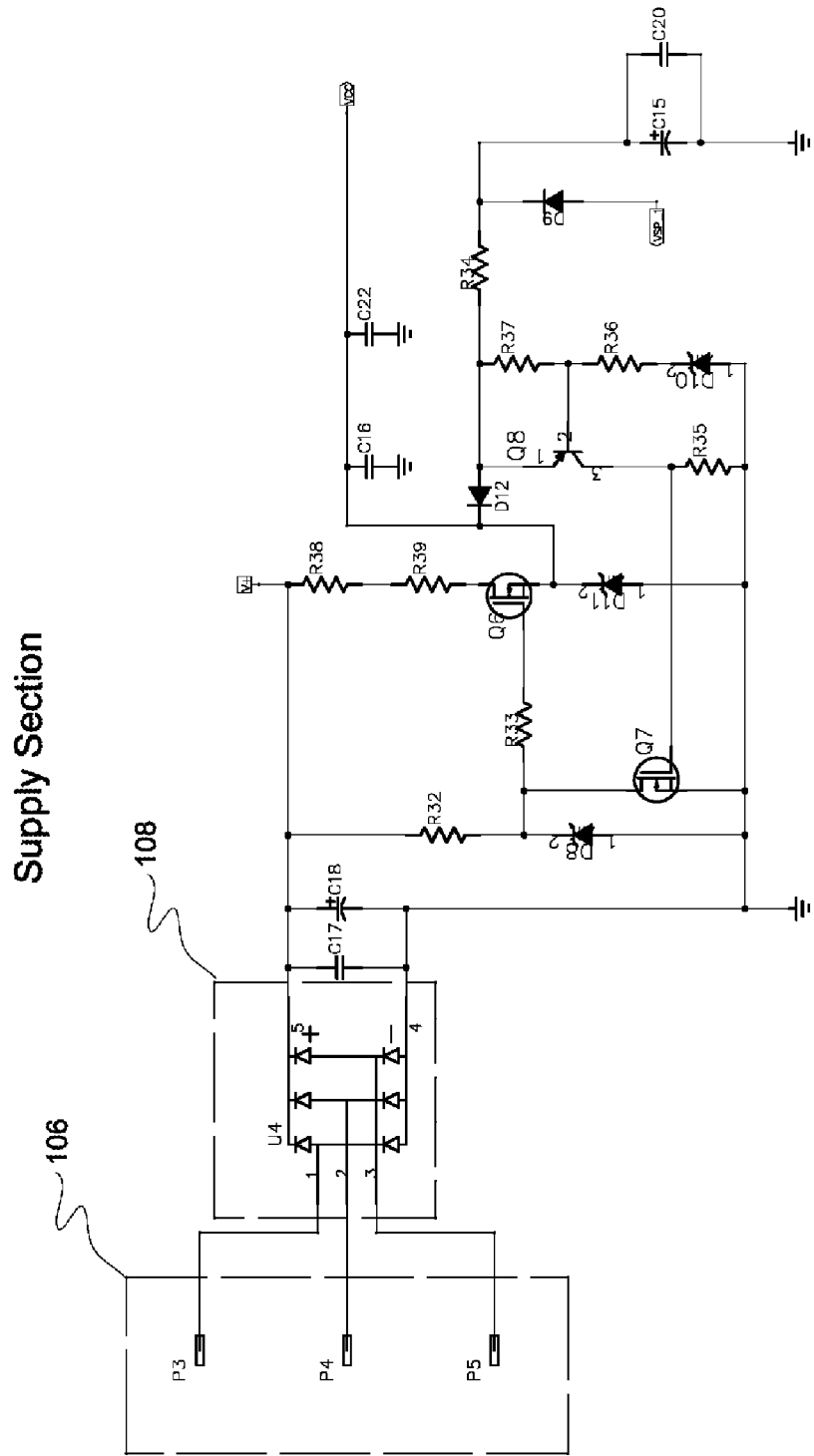
FIG. 6 depicts a schematic diagram of the circuitry of a first portion of a switch mode rectifier included in an energy control module according to one embodiment of the apparatus of FIG. 1.
Figure 7:
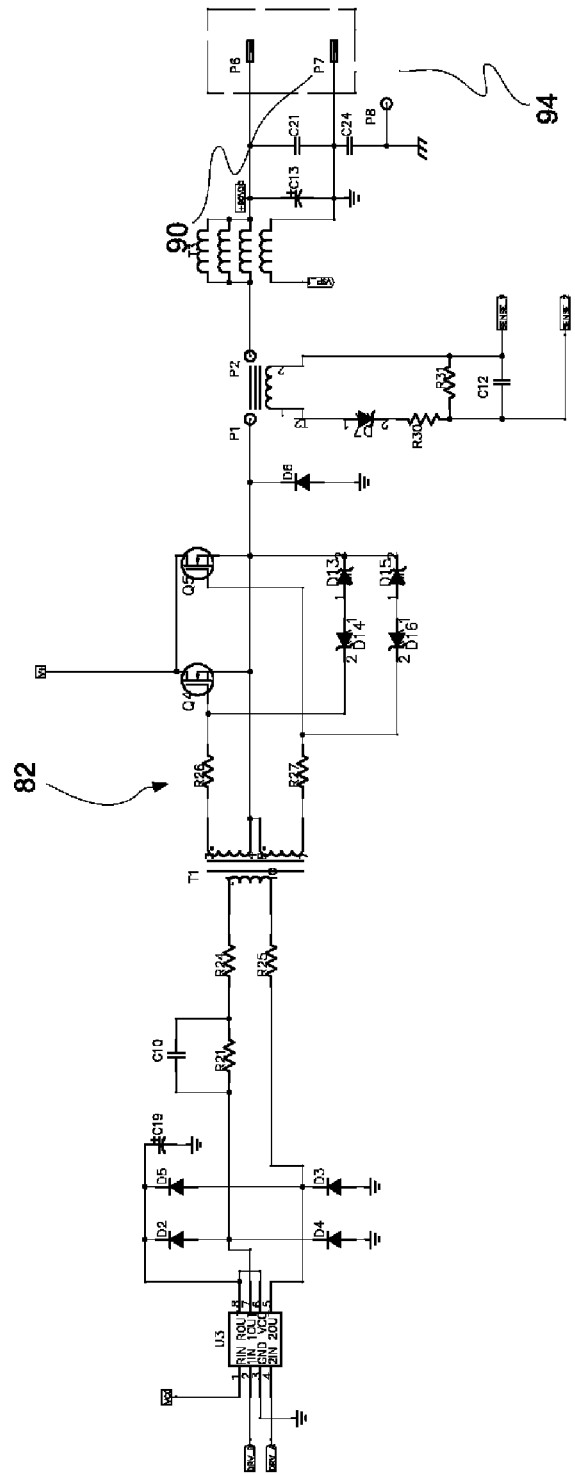
FIG. 7 depicts a schematic diagram of the circuitry of a second portion of a switch mode rectifier included in an energy control module according to one embodiment of the apparatus of FIG. 1.
Figure 8:
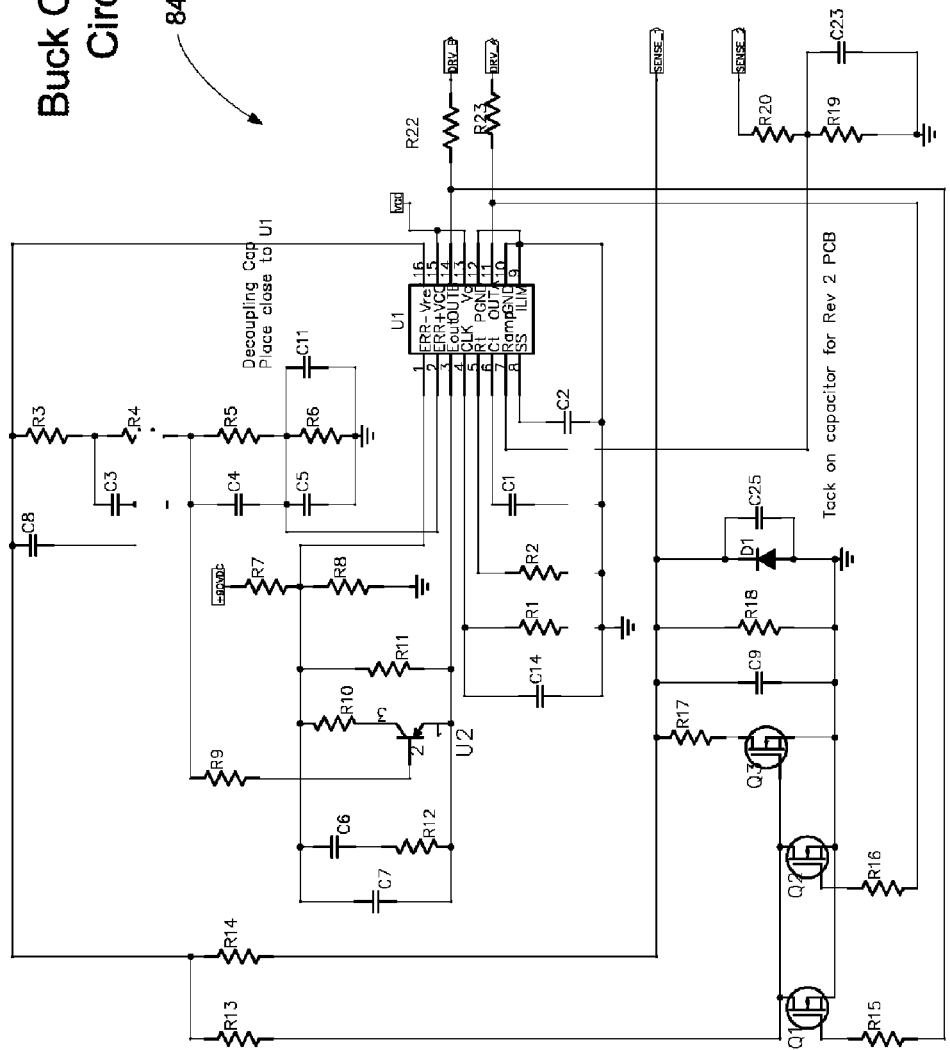
FIG. 8 depicts a schematic diagram of the circuitry of a third portion of a switch mode rectifier included in an energy control module according to one embodiment of the apparatus of FIG. 1.
Figure 9:
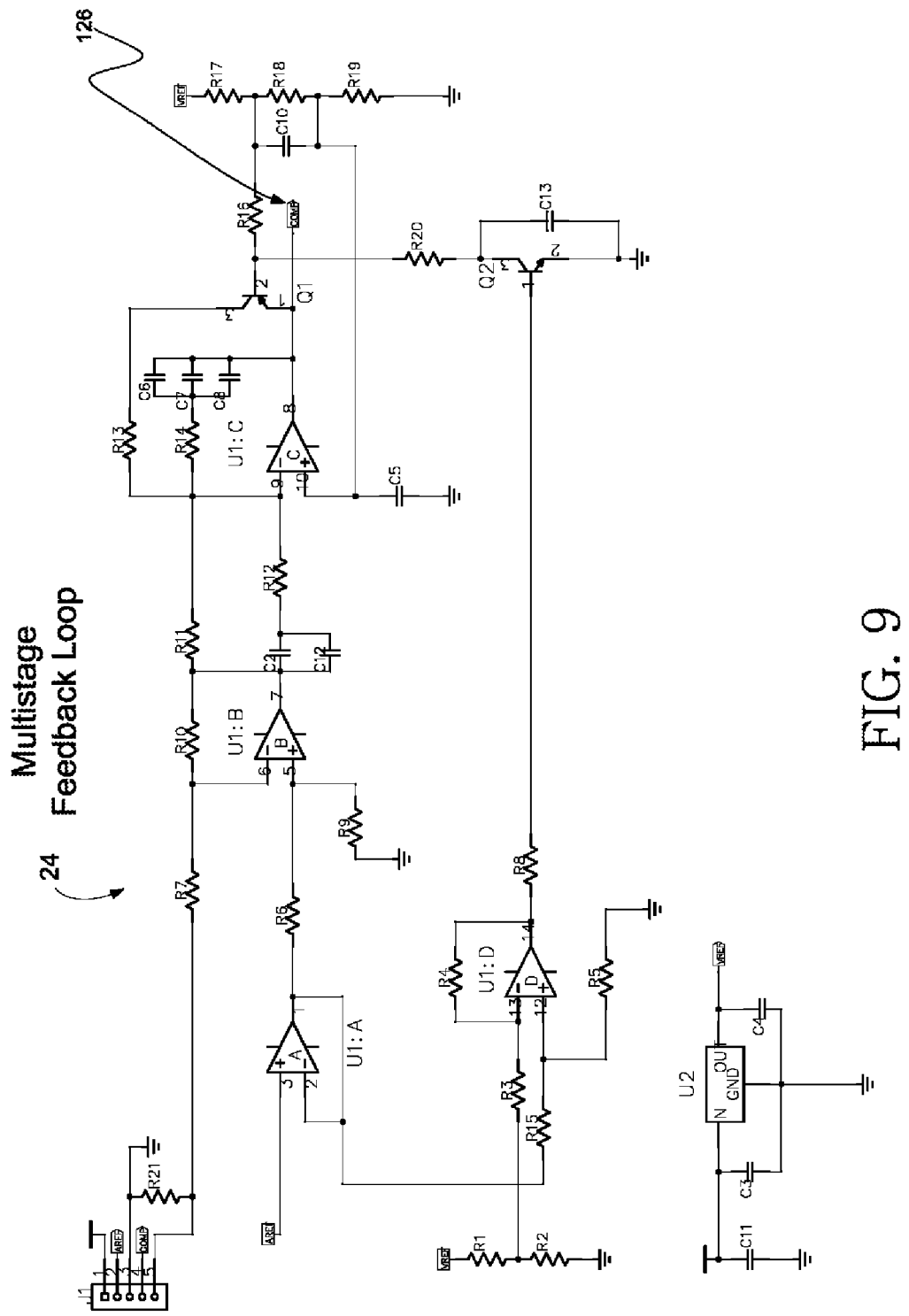
FIG. 9 depicts a schematic diagram of the circuitry of a multistage feedback loop included in an energy control module according to one embodiment of the apparatus of FIG. 1.

FIG. 9 depicts a sample schematic for the multistage feedback loop 24 (See FIG. 1). FIGS. 6, 7 and 8 depict sample schematics for portions of the switch mode rectifier 22. FIG. 6 shows the supply section. FIG. 7 shows sample schematics for the buck converter 82. FIG. 8 shows sample schematics for the buck control circuit 84.

FIG. 10 depicts sample schematics for the pulse width modulation generator 26. Often, the alternator 12 must be primed, for example by using an external supply to apply a low-voltage, low current source for initially activating or exciting the alternator. Thus, as shown in FIG. 10, the pulse width modulation generator 26 includes circuitry for a primer 134. However, other priming mechanisms and circuitry may also be used, as would be understood by one of skill in the art. Furthermore, in some embodiments, no priming is required because there may be enough residual magnetism to start up on rotational energy alone.

In operation, when the prime mover 40 turns the pulley assembly 38, the rotor assemblies 56 and 58 inside the alternator 12 rotate inside the stator windings 48. This creates an electromagnetic field producing current flow through the leads of the wye output 30 to the frequency converter 32. This electricity is converted to the desired frequency and applied to drive the load 36 or 36a.

The output of the alternator 12 is held constant by the multistage feedback loop 24 connected to the pulse width modulation generator 26. Thus, the constituent parts of the energy control module 14 (the switch mode rectifier 22, the multi-stage feedback loop 24, and the pulse width modulation generator 26) monitor the output of the alternator 12 and adjust the voltage of the high-voltage direct current field winding 18, which varies the magnetic field to control the output voltage to a constant preset value.

The alternator assembly design provides (i) increased magnetic fields and reduction of stray fields in the rotor assembly due to the magnetic isolation previously discussed; (ii) increased stator output due to the reduction of copper losses and reduction of inductance in the gap between the segments where no work is being done; and (iii) improved thermal efficiency by reducing stray fields and unneeded inductance, both of which produce heat. The AMPS device 10 provides a high level of AC power for sensitive electronics including computers and medical equipment as well as general equipment. The AMPS device can provide this power over a wide range of rotational input speeds from the primary mover or energy source. This allows users to power equipment, even while in motion as in the case of a vehicle mounted system, or with varying flows in the case of water and wind. The AMPS device can also control and regulate torque while producing said power The AMPS device 10 may be driven by a variety of prime movers 40. For example, an idling internal combustion engine typically has "excess" power being wasted. By connecting the AMPS apparatus to that engine, a ready supply of AC power may be tapped.

Figure 11:
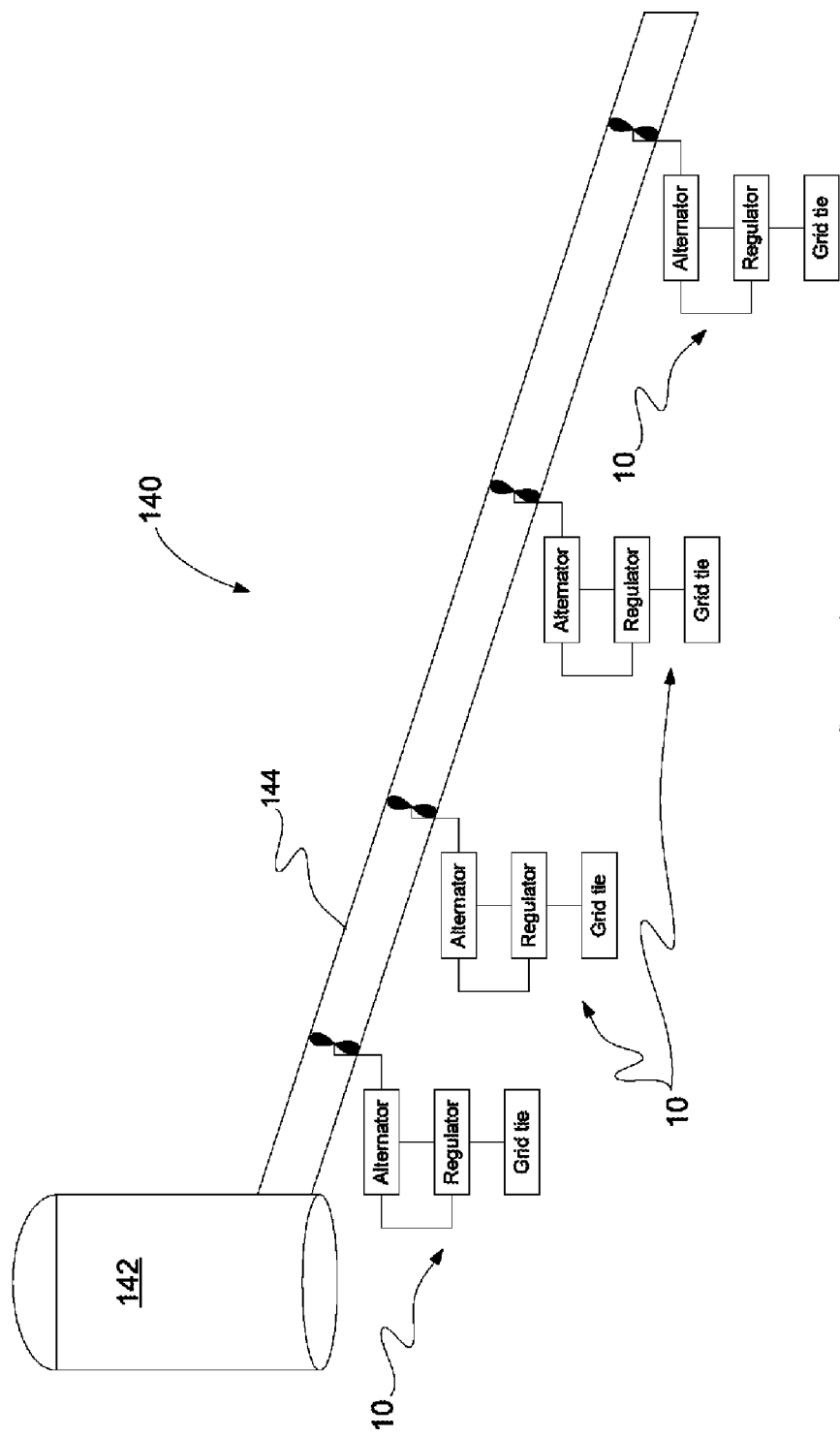
FIG. 11 depicts a block diagram showing a water supply environment in which the apparatus of FIG. 1 may be employed.

Another potential prime mover involves falling water. That is, in a typical municipal water supply, the water begins at high pressure and is gradually brought down in pressure using a series of pressure relief valves before providing the water to a home or office building. FIG. 11 schematically depicts this reduction in pressure.

As depicted in FIG. 11, in a typical municipal water supply 140, a source of elevated water storage 142 releases water down distribution pipes 144. Pressure relief valves placed at various locations along the pipes relieve the water pressure in the pipes to prevent excess pressure from bursting the pipes. As depicted in FIG. 11, those pressure relief valves may be replaced by a series of auto-regulated motion power system ("AMPS") devices 10. The excess pressure of the falling water drives a turbine (a prime mover 40) connected to the alternator 12. Driving the alternator takes pressure out of the water line and the alternator produces power that may be used or fed into the electrical grid.

The AMPS apparatus 10 also reduces the footprint of both the alternator 12 and the switch mode rectifier 22 compared to traditional generators. Thus, the output power is achieved using less space than many products for equivalent power outputs. The AMPS apparatus may be manufactured with a modular design. This allows for the positioning of module units in various locations of a vehicle or other application uses where space may be limited to accommodate a large unit, but could accommodate several smaller units placed in various locations of the vehicle, thus maximizing power output with limited space.

Although the embodiments discussed in this disclosure are described with respect to embodiments involving engine, wind and hydro applications, the present apparatus may be scaled for a wide variety of other applications. Thus, the present invention has several advantages over the prior art. Although embodiments of the present invention have been described, various modifications and changes may be made by those skilled in the art without departing from the spirit and scope of the invention.

The invention claimed is:

1. An apparatus for converting energy from a rotating source of mechanical energy into electrical energy comprising:
    an alternator comprising:
        two Lundell type high voltage dual claw pole rotor assemblies keyed on a common shaft adapted to be connected to a source of rotating mechanical energy, the rotor assemblies being oriented North-South-South-North from end to end and having a gap of a predetermined size therebetween to enable the rotor assemblies to develop independent magnetic fields, the rotor assemblies mounted inside a housing containing a single cylindrical stator having multiple windings, each winding being wound through two separate laminated steel sections with a gap between each of the stator windings, each stator winding being configured to operate in phase with the other stator winding;
        a three-phase high-voltage alternating current wye (Y) output; and
        a high-voltage direct current field winding connected to the rotor and having a positive connection and a negative connection; and
    an energy control module comprising:
        a switch mode rectifier having:
            an input connected to the wye (Y) output of the alternator;
            a three-phase rectifier for receiving power from the wye (Y) output and rectifying the power to direct current;
            a buck converter that takes the direct current from the three-phase rectifier and reduces the direct current input voltage to a predetermined direct current output voltage;
            a positive output connected to the positive connection of the direct current field of the alternator; and
            a negative return;
        a pulse width modulation controller comprising a high-frequency pulse width modulation switch connected between the negative return and the negative connection of the direct current field winding; and
        a multi-stage feedback loop connected to the wye (Y) output and configured to monitor the voltage level of the wye (Y) output and use that information to control the pulse width modulation switch and thereby control generation of power using the alternator and maintain the voltage on the wye (Y) output at a first predetermined voltage.

2. The apparatus of claim 1 further comprising a battery connected between the positive connection of the direct current field winding and the negative return, the battery configured to provide an initial excitation voltage for the alternator and to provide a housekeeping power for the regulator.

3. The apparatus of claim 1 further comprising a frequency converter connected to the wye (Y) output to convert the first predetermined voltage on the wye (Y) output to a second predetermined voltage and to a predetermined frequency.

4. The apparatus of claim 1 in which the stator segments are keyed together.

5. An apparatus for converting mechanical energy into electrical energy comprising:
    an alternator comprising:
        a rotor assembly adapted to be connected to a source of mechanical energy and mounted inside a housing containing a stator;
        a three-phase high-voltage alternating current wye (Y) output; and
        a high-voltage direct current winding connected to the rotor assembly; and
    an energy control module comprising:
        a switch mode rectifier having:
            an input connected to the wye (Y) output;
            a three-phase rectifier for receiving power from the wye (Y) output and rectifying the power to direct current;
            a buck converter that takes the direct current from the three-phase rectifier and reduces the direct current input voltage to a predetermined direct current output voltage;
            a positive output connected to the positive connection of the direct current winding of the alternator; and
            a negative return;
        a pulse width modulation controller comprising a high-frequency pulse width modulation switch connected between the negative return and the negative connection of the direct current winding; and
        a multi-stage feedback loop connected to the wye (Y) output.

6. The apparatus of claim 5 in which the mechanical energy is rotational mechanical energy.

7. The apparatus of claim 5 in which the rotor assembly comprises two Lundell type high voltage dual claw pole rotors keyed on a common shaft.

8. The apparatus of claim 7 in which the pole rotors are oriented North-South-South-North from end to end and have a gap of a predetermined size therebetween to enable the rotor assemblies to develop independent magnetic fields.

9. The apparatus of claim 8 wherein the stator has having multiple windings, each winding being wound through two separate laminated steel sections with a gap between each of the stator windings, each stator winding being configured to operate in phase with the other stator winding.

10. The apparatus of claim 5 further comprising a high-voltage direct current winding connected to the rotor assembly and having a positive connection and a negative connection.

11. The apparatus of claim 5 wherein a multi-stage feedback loop is configured to monitor the voltage level of the wye (Y) output and use that information to control the pulse width modulation switch and thereby control generation of power using the alternator and maintain the voltage on the wye (Y) output at a first predetermined voltage.

12. An apparatus for converting mechanical energy into electrical energy comprising:
- an alternator having a rotor assembly, a stator, an alternating current output, a direct current winding connected to the rotor assembly; and
- an energy control module having a switch mode rectifier, a pulse width modulation controller, and a multi-stage feedback loop; and
- two Lundell type high voltage dual claw pole rotors keyed on a common shaft, the pole rotors being oriented North-South-South-North from end to end and having a gap of a predetermined size therebetween to enable the rotor assemblies to develop independent magnetic fields.

13. The apparatus of claim 12 wherein the stator has multiple windings, each winding being wound through two separate laminated steel sections with a gap between each of the stator windings, each stator winding being configured to operate in phase with the other stator winding.

14. The apparatus of claim 12 wherein the multi-stage feedback loop is configured to monitor the alternating current output and use that information to control the pulse width modulation switch and thereby control generation of power using the alternator and maintain the voltage on the alternating current output at a predetermined voltage.

* * * * *